Patented Feb. 17, 1948

2,436,135

UNITED STATES PATENT OFFICE 2,436,135

HALOGENATION OF FLUORINATED COMPOUNDS

Paul L. Barrick, Wilmington, Del., and Robert E. Christ, Elizabeth, N. J., assignors to E. I. du Pont de Nemours & Company, Wilmington, Del., a corporation of Delaware No Drawing. Application November 9, 1943, Serial No. 509,624

2 Claims. (Cl. 260—653)

This invention relates to highly halogenated organic compounds and more particularly to the halogenation of highly fluorinated organic compounds.

This invention has as an object the provision of a new class of halogenated fluorine-containing organic compounds. A further object is the halogenation of terminally substituted halocarbons containing four or more carbon atoms. A still further object is the halogenation of terminally substituted fluorocarbons. Additional objects will become apparent from an examination of the following description and claims.

These and other objects and advantages are accomplished by the following invention which broadly comprises halogenating with a halogen having an atomic weight of less than 80, a terminally substituted fluorine containing halocarbon having the general formula $H(CZ_2CZ_2)_nRH_b$ in which the Z substituents are halogen atoms of which at least 3 are fluorine atoms, $n$ is a positive integer within the range of from 1 to 12, $b$ is a positive integer, and $RH_b$ represents a halogen-free saturated monovalent organic radical containing at least 2 carbon atoms and containing $b$ hydrogen atoms attached directly to carbon atoms.

In a more restricted sense this invention comprises chlorinating a terminally substituted fluorocarbon having the general formula

$$H(CF_2CF_2)_nRH_b$$

wherein $n$ is a positive integer within the range of from 1 to 12, $b$ is a positive integer, and $RH_b$ represents a halogen-free saturated monovalent organic radical containing at least 2 and not more than 8 carbon atoms and containing $b$ hydrogen atoms attached directly to carbon atoms.

A preferred embodiment of this invention comprises admixing chlorine in the presence of light with a carbon tetrachloride solution of a compound having the general formula

$$H(CF_2CF_2)_nRH_b$$

wherein $n$ is a positive integer within the range of from 1 to 5, $b$ is a positive integer within the range of from 5 to 17, and $RH_b$ represents a saturated monovalent aliphatic hydrocarbon radical containing $b$ hydrogen atoms and at least 2 and not more than 8 carbon atoms.

The novel compounds of this invention, which are obtained by the process of this invention, are terminally substituted halocarbons having the general formula $X(CZ_2CZ_2)_nRH_{b-d}Y_d$ wherein X is an atom selected from the group consisting of hydrogen and halogen atoms of atomic weight less than 80, the Z substituents are halogen atoms of which at least 3 are fluorine atoms, $n$ is a positive integer within the range of from 1 to 12, R is a halogen-free saturated polyvalent organic radical containing at least 2 carbon atoms and having a valence of $b+1$, $b$ is a positive integer and represents the total number of hydrogen and halogen atoms attached directly to carbon atoms of the radical R, $d$ is a number selected from the group consisting of 0 and positive integers not greater than $b$, Y is a halogen atom of atomic weight less than 80, and the group represented by $XRH_{b-d}Y_d$ contains at least 1 halogen atom.

In a more restricted sense the compounds of this invention are chlorinated terminally substituted fluorocarbons having the general formula $X(CF_2CF_2)_nRH_{b-d}Cl_d$ wherein X is an atom selected from the group consisting of hydrogen and chlorine atoms, $n$ is a positive integer within the range of from 1 to 12, R is a radical, having a valence of $b+1$, which is devoid of multiple bonds and consists of from 2 to 8 carbon atoms, $b$ is a positive integer and represents the total number of hydrogen and chlorine atoms attached directly to carbon atoms of the radical R, $d$ is a positive integer not greater than $b$, and $RH_{b-d}Cl_d$ represents a chlorine substituted saturated monovalent aliphatic hydrocarbon radical containing at least 2 and not more than 8 carbon atoms.

A preferred compound is a chlorinated terminally substituted liquid fluorocarbon having the general formula $H(CF_2CF_2)_nRH_{b-d}Cl_d$ wherein $n$ is a positive integer within the range of from 1 to 5, R is a radical, having a valence of $b+1$, which is devoid of multiple bonds and consists of from 2 to 8 carbon atoms, $b$ is a positive integer within the range of from 5 to 17 and represents the total number of hydrogen and chlorine atoms attached directly to carbon atoms of the radical R, $d$ is a positive integer greater than 1 and not greater than $b$, and $RH_{b-d}Cl_d$ represents a chlorine substituted saturated monovalent aliphatic hydrocarbon radical containing at least 2 chlorine atoms and at least 2 and not more than 8 carbon atoms.

Reactions involved in the preparation of halogenated terminally substituted halocarbons in accordance with this invention are represented below. For convenience of illustration the reactions are presented for chlorination of fluorocarbons terminally substituted with a saturated aliphatic hydrocarbon.

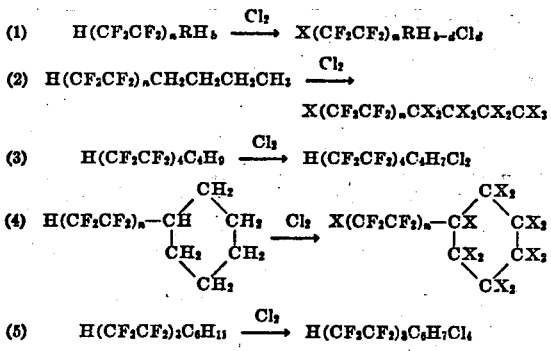

(1) $H(CF_2CF_2)_nRH_b \xrightarrow{Cl_2} X(CF_2CF_2)_nRH_{b-d}Cl_d$ (2) $H(CF_2CF_2)_nCH_2CH_2CH_2CH_3 \xrightarrow{Cl_2}$
    $X(CF_2CF_2)_nCX_2CX_2CX_2CX_3$ (3) $H(CF_2CF_2)_4C_4H_9 \xrightarrow{Cl_2} H(CF_2CF_2)_4C_4H_7Cl_2$ (4) $H(CF_2CF_2)_n$—cyclohexyl $\xrightarrow{Cl_2} X(CF_2CF_2)_n$—chlorocyclohexyl (5) $H(CF_2CF_2)_2C_6H_{11} \xrightarrow{Cl_2} H(CF_2CF_2)_2C_6H_7Cl_4$ In the above equations $n$ is a positive integer within the range of from 1 to 12, R is a radical, containing at least 2 carbon atoms, which is devoid of multiple bonds and consists solely of carbon atoms, $b$ is a positive integer, $d$ is a number selected from the group consisting of 0 and positive integers not greater than $b$, the X substituents are atoms selected from the group consisting of hydrogen and chlorine, and the product in each of the above reactions contains at least one chlorine atom.

The following examples, in which proportions are given in parts by weight unless otherwise specified, are given for illustrative purposes and are not intended to place any restrictions or limitations on the herein described invention:

*Example I*

One hundred and fifteen parts of freshly distilled cyclohexane and 1 part of benzoyl peroxide were charged into a stainless steel autoclave and after cooling and evacuating, 50 parts of tetrafluoroethylene was added. The autoclave was closed and heated at 110° C. with agitation for about 8 hours. The reaction vessel was cooled to room temperature and the gases bled off. A colorless liquid reaction mixture was obtained and fractionally distilled through an efficient packed column to remove the unreacted cyclohexane and to separate the products into the following fractions:

| Boiling Point | Refractive Index $n_D^{25}$ | Analysis | | | Ratio $C_2F_4/C_6H_{12}$ |
|---|---|---|---|---|---|
| | | F% | C% | H% | |
| 141.5–142° C. | 1.3841 | 39.83 | 53.21 | 6.83 | |
| Calculated for $HCF_2CF_2C_6H_{11}$ | | 41.3 | 52.2 | 6.52 | 1/1 |
| 74–77° C./21 mm | 1.3626 | 52.60 | 37.00 | 4.69 | |
| Calculated for $H(CF_2CF_2)_2C_6H_{11}$ | | 53.5 | 42.2 | 4.22 | 2/1 |
| 96–106° C./21 mm | 1.3570 | 58.22 | 34.11 | 3.51 | |
| Calculated for $H(CF_2CF_2)_3C_6H_{11}$ | | 59.4 | 37.5 | 3.12 | 3/1 |

The liquid fraction boiling at 141.5–142° C. was dissolved in carbon tetrachloride and treated with chlorine under the catalytic influence of light for one hour. Hydrogen chloride was evolved. The reaction mixture was fractionally distilled under reduced pressure to separate the following polychlorinated tetrafluoroethylcyclohexanes:

| Boiling Point | Refractive Index $n_D^{25}$ | Analysis | |
|---|---|---|---|
| | | F% | Cl% |
| 137–145° C./20 mm | 1.4715 | 23.52 | 44.66 |
| Calculated for $C_8H_8F_4Cl_4$ | | 23.6 | 44.1 |
| 146–155° C./20 mm | 1.4908 | 21.87 | 48.86 |
| Calculated for $C_8H_7F_4Cl_5$ | | 21.3 | 49.8 |

*Example II*

A silver-lined high pressure reaction vessel was flushed with nitrogen and charged with 154 parts of dioxane (which had been freshly distilled from sodium) and 1.5 parts of benzoyl peroxide. The reaction vessel was evacuated and pressured with tetrafluoroethylene to give 350 lbs./in.$^2$ at 110° C. After heating for a short time, the autoclave was cooled and the excess gas bled off. The liquid reaction mixture was steam distilled to yield 34 parts of steam-volatile, water-insoluble liquid heavier than water. The liquid was separated, dried, and fractionally distilled through an efficient packed column to yield a series of products in which the percentage of fluorine increased with increase in boiling point.

| | F | C | H | Ratio $(C_2F_4)/C_4H_8O_2$ |
|---|---|---|---|---|
| | Percent | Percent | Percent | |
| Analysis of fraction boiling at 144–162° C. | 39.2 | 38.6 | 4.5 | |
| Calculated for $H$—$C_2F_4$—$C_4H_7O_2$ (dioxane ring) | 40.4 | 38.3 | 4.26 | 1/1 |
| Analysis of fraction boiling at 200°–204° C. | 53.0 | 28.9 | 2.5 | |
| Calculated for $H(C_2F_4)_2C_4H_7O_2$ | 52.8 | 33.3 | 2.78 | 2/1 |

The tetrafluoroethyldioxane fraction boiling at 144–162° C. was dissolved in carbon tetrachloride and treated with chlorine under the catalytic influence of light for one hour. Upon distillation of the reaction mixture a fraction boiling at 71–72° C./2 mm. was isolated and found to contain three chlorine atoms.

|  | F% | Cl% |
|---|---|---|
| Analysis: Found | 24.7 | 36.7 |
| Calc. for C₉H₅O₂F₄Cl₃ | 26.1 | 36.6 |

*Example III*

Thirty-two parts of tetrafluoroethylene/n-butane reaction product boiling at 94–111° C./31 mm. consisting mainly of H(C₂F₄)₄C₄H₉ was dissolved in carbon tetrachloride and treated with chlorine in the presence of light for about five hours. Carbon tetrachloride was removed and the chlorinated products were fractionated under reduced pressure. A series of chlorinated products boiling from about 114° C./28 mm. to 113° C./1.5 mm. and containing from one to about four chlorine atoms were obtained.

| Boiling Point | Analysis | |
|---|---|---|
|  | F% | Cl% |
| 131–148° C./28 mm | 55.87 | 15.37 |
| 111.5–113° C./1.5 mm | 50.29 | 24.38 |
| Calculated for C₁₃F₁₆H₇Cl₃ | 57.7 | 13.48 |
| Calculated for C₁₃F₁₆H₇Cl₃ | 54.2 | 18.97 |
| Calculated for C₁₃F₁₆H₆Cl₄ | 51.0 | 23.8 |

A sample of the above terminally substituted fluorocarbon was treated with liquid bromine in the presence of sunlight to yield a series of bromo derivatives with the evolution of hydrogen bromide.

*Example IV*

Two hundred parts of the steam-volatile tetrafluoroethylene/isobutane reaction products

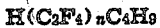

in which $n$ varies from 1 to about 5, was dissolved in carbon tetrachloride and treated with chlorine in the presence of light for fifteen hours. After removing the carbon tetrachloride, a series of chlorinated non-flammable liquid products boiling at 170° C. to about 300° C. with 95 per cent of the total products boiling at 205° C. to 270° C. was obtained. The chlorinated reaction mixture had a viscosity of 5 centistokes at 38° C. and a low pour point.

| Boiling Point | $d_4^{25}$ | Analysis | |
|---|---|---|---|
|  |  | Cl% | F% |
| 205–238° C | 1.6487 | 35.37 | 34.6 |
| 238–270° C | 1.7198 | 29.20 | 41.5 |

It is to be understood that the herein described invention is adapted to the halogenation of any terminally substituted halocarbon having the general formula H(CZ₂CZ₂)ₙRHb wherein the Z substituents are halogen atoms of which at least 3 are fluorine atoms, $n$ is a positive integer within the range of from 1 to 12, and RHb represents a halogen-free saturated monovalent organic radical containing $b$ hydrogen atoms attached directly to carbon atoms and containing at least 2 carbon atoms. Said terminally substituted halocarbons are prepared by reacting a tetrahaloethylene containing at least 3 fluorine atoms with a saturated non-polymerizable organic compound having the general formula RHb+1, in which RHb is a halogen-free saturated monovalent organic radical containing at least two carbon atoms and containing $b$ hydrogen atoms attached directly to carbon atoms. A convenient method of preparing said halocarbons comprises heating a mixture of the aforementioned tetrahaloethylene and saturated non-polymerizable organic compound RHb+1 at a temperature within the range of from 50° C. to 250° C. Specific methods of obtaining terminally substituted halocarbons adapted for use in the process of this invention are described in detail in copending U. S. applications Serial No. 484,290, filed April 23, 1943, by Paul L. Barrick; Serial No. 484,298, now Patent No. 2,411,158 of April 18, 1945, filed April 23, 1943, by William E. Hanford; Serial No. 484,299, now Patent No. 2,433,844 of January 6, 1948, filed April 23, 1943, by William E. Hanford; and Serial No. 484,300, now abandoned, filed April 23, 1943, by William E. Hanford and Robert M. Joyce, Jr.

While any tetrahaloethylene containing at least three fluorine atoms may be employed in the production of the terminally substituted halocarbons which are subsequently halogenated in accordance with this invention, the preferred tetrahaloethylene is tetrafluoroethylene. Non-polymerizable halogen-free organic compounds suitable for reaction with the tetrahaloethylene are free from ethylenic and acetylenic linkages. These saturated organic non-polymerizable compounds, which may be represented by the general formula RHb+1, may be acyclic or cyclic, including aliphatic, cycloaliphatic, heterocyclic, alkylaromatic and aromatic saturated organic non-polymerizable compounds. Included among the aforesaid compounds RHb+1 are ethers, hydrocarbons, alcohols, acids, esters, ketones and the like. Examples of suitable specific compounds are diethyl ether, dioxane, methylal, diethyl acetal, propane, isobutane, isooctane, cyclohexane, methylcyclohexane, toluene, xylene, ethanol, isopropanol, octanol, acetic acid, propionic acid, isobutyric acid, acetic anhydride, propionic anhydride, butyric anhydride, ethyl acetate, isobutyl acetate, the amyl acetates, ethyl propionate, ethyl isobutyrate, acetone, methyl ethyl ketone, cyclohexanone, methylcyclohexanone and the like. In order to provide terminally substituted halocarbons best adapted for halogenation according to the process of the instant invention, it is preferred that tetrafluoroethylene should be reacted with a saturated non-polymerizable halogen-free organic compound having the general formula RHb+1, which is a saturated aliphatic hydrocarbon, such as ethane, propane, butane, isobutane, a pentane, a hexane, cyclohexane, cyclopentane, isooctane, and the like.

As hereinbefore stated, there may be halogenated by the process of this invention any terminally substituted halocarbon having the general formula H(CZ₂CZ₂)ₙRHb wherein the Z substituents are halogen atoms of which at least 3 are fluorine atoms, $n$ is a positive integer within the range of from 1 to 12, $b$ is a positive integer, and RHb represents a halogen-free saturated monovalent organic radical containing at least 2 carbon atoms and containing $b$ hydrogen atoms attached directly to carbon atoms. Examples of halogens represented by Z are fluorine, chlorine, bromine and iodine; while examples of halogen-free saturated monovalent organic radicals represented by $RH_b$ include: alkyl, e. g., ethyl, butyl, and the like; aralkyl, e. g., benzyl; and cycloalkyl, e. g., cyclohexyl and the like groups which may be substituted by functional groups such as carboxyl, e. g., —$COOC_2H_5$, alkoxy, e. g., —$O$—$C_2H_5$, hydroxy, carbonyl, and cyano groups, and the like.

While any terminally substituted halocarbon having the general formula $H(CZ_2CZ_2)_nRH_b$ as hereinbefore defined may be employed in our process, it is to be understood that superior products are had when the halocarbon reacted has the general formula $H(CF_2CF_2)_nRH_b$ wherein $n$ is a positive integer within the range of from 1 to 5, $b$ is a positive integer within the range of from 5 to 17, and $RH_b$ is a saturated monovalent aliphatic or cycloaliphatic hydrocarbon radical containing $b$ hydrogen atoms and at least 2 and not more than 8 carbon atoms. Examples of straight and branched chained aliphatic hydrocarbon radicals which are contemplated include ethyl, propyl, butyl, isobutyl, the pentyl, the hexyl, the heptyl, the octyl and higher alkyl radicals. Substituted and unsubstituted cycloaliphatic hydrocarbon radicals, which are operable, include for example, cyclopropyl, cyclobutyl, cyclopentyl, methyl cyclopentyl, cyclohexyl and methyl cyclohexyl radicals.

In addition to chlorination, the compounds $H(CZ_2CZ_2)_nRH_b$ may be halogenated by means of bromine in the presence or absence of a solvent as mentioned in Example III. The chlorinated products may also be fluorinated by treating with inorganic fluorinating agents such as antimony fluorides, silver fluoride or hydrogen fluoride.

It will be understood that the operating conditions for the halogenations may vary widely depending upon the nature of the compounds being reacted and also upon the results desired. It is often desirable to use a catalyst such as light, heat, polyvalent metal halides, e. g., ferric chloride, and the like.

The temperature at which the halogenation reaction is effected may be varied over a wide range. In general it is desirable to carry out the reaction at a temperature within the range of from 0° C. to 150° C., but higher and lower temperatures may also be used. The temperature should be below that at which decomposition of the reactants and/or products occurs.

As hereinbefore stated, the novel compounds of this invention are terminally substituted halocarbons having the general formula $$X(CZ_2CZ_2)_nRH_{b-d}Y_d$$

wherein $X$ is an atom selected from the group consisting of hydrogen and halogen atoms of atomic weight less than 80, the $Z$ substituents are halogen atoms of which at least 3 are fluorine atoms, $n$ is a positive integer within the range of from 1 to 12, $R$ is a halogen-free saturated polyvalent organic radical containing at least 2 carbon atoms and having a valence of $b+1$, $b$ is a positive integer and represents the total number of hydrogen and halogen atoms attached directly to carbon atoms of the radical $R$, $d$ is a number selected from the group consisting of 0 and positive integers not greater than $b$, (i. e., $d$ is a whole number within the range of from 0 to a number not greater than $b$), $Y$ is a halogen atom of atomic weight less than 80, and the group represented by $XRH_{b-d}Y_d$ contains at least one halogen atom. Superior, and therefore preferred, products are those having the general formula $X(CF_2CF_2)_nRH_{b-d}Y_d$ wherein $X$ is a member selected from the group consisting of hydrogen and halogens having an atomic weight of less than 80, $n$ is a positive integer within the range of from 1 to 5, $R$ is a radical, containing at least 2 carbon atoms, which is devoid of multiple bonds and consists solely of carbon atoms, $b$ is a positive integer and represents the total number of hydrogen and halogen atoms attached directly to carbon atoms of the radical $R$, $d$ is a positive integer not greater than $b$, and $Y$ is a halogen atom of atomic weight less than 80. Liquid products having the general formula $$X(CF_2CF_2)_nRH_{b-d}Cl_d$$

wherein $X$ is a member selected from the group consisting of hydrogen and chlorine, $n$ is a positive integer within the range of from 1 to 5, $R$ is a radical, containing at least 2 and not more than 8 carbon atoms, which is devoid of multiple bonds and consists solely of carbon atoms, $b$ is a positive integer and represents the total number of hydrogen and chlorine atoms attached directly to carbon atoms of the radical $R$, and $d$ is a positive integer not greater than $b$, are obtained most readily by the process of this invention, have greatest utility, and are therefore preferred. Particular significance is attached to the liquid products $X(CF_2CF_2)_nRH_{b-d}Cl_d$ wherein $X$ is an atom selected from the group consisting of hydrogen and chlorine atoms, $n$ is a positive integer within the range of from 1 to 5, $R$ is a radical which consists solely of from 2 to 8 carbon atoms and is devoid of multiple bonds, $b$ is a positive integer within the range of from 5 to 17, and $d$ is a positive integer greater than 1 and not greater than $b$. Included among said liquid products are compounds having the general formulae $H(CF_2CF_2)_nCX_2CX_2CX_2CX_3$, $X(CF_2CF_2)_nCX_2CX_2CX_2CX_3$,

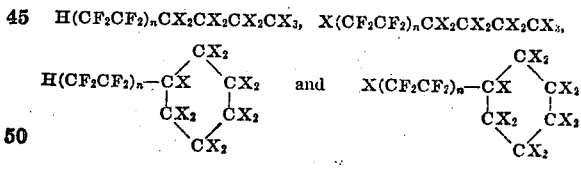

wherein $n$ is a positive integer within the range of from 1 to 5, and the $X$ substituents are atoms selected from the group consisting of hydrogen and chlorine atoms, at least 2 of the $X$ substituents being chlorine atoms.

It is to be understood that the symbol $R$, as employed in the formulae herein and in the appended claims, e. g., in the formulae $$H(CZ_2CZ_2)_nRH_b, \ H(CF_2CF_2)_nRH_b$$

$X(CZ_2CZ_2)_nRH_{b-d}Y_d$ and $H(CF_2CF_2)_nRH_{b-d}Y_d$, represents a halogen-free saturated polyvalent organic radical which contains at least 2 carbon atoms and has a valence of $b+1$; while $RH_b$ represents a halogen-free saturated monovalent organic radical containing at least 2 carbon atoms and containing $b$ hydrogen atoms attached directly to carbon atoms; and $RH_{b-d}Y_d$ represents a saturated monovalent organic radical containing at least 2 carbon atoms and containing $(b-d)$ hydrogen atoms attached directly to carbon atoms and $d$ atoms of a halogen having an atomic weight of less than 80 attached directly to carbon atoms. Examples of radicals R contemplated are:

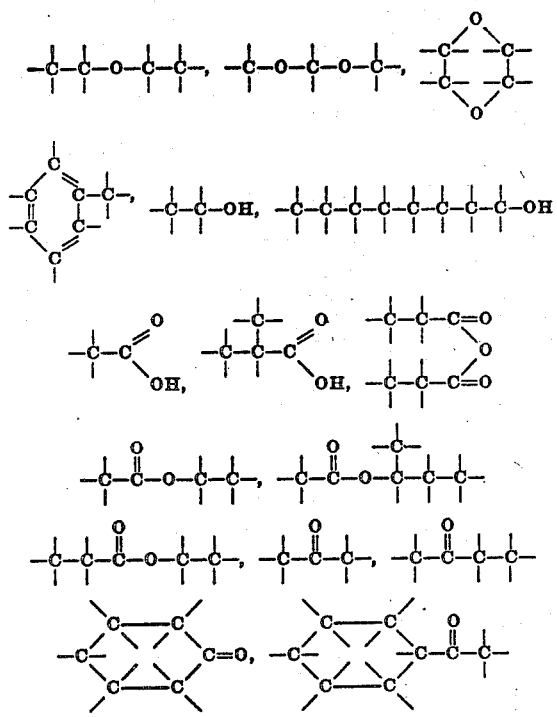

While any radical R as hereinbefore defined is operable in our invention, superior results are had when said R is a radical which is devoid of multiple bonds and consists solely of from 2 to 8 carbon atoms. Examples of said radical R are:

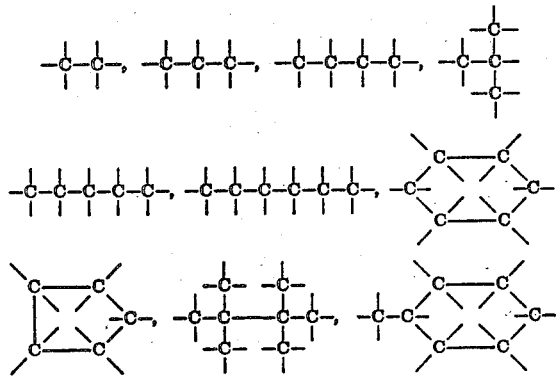

The terminally substituted halocarbon compounds which are halogenated in accordance with this invention are prepared by reacting a tetrahaloethylene containing at least 3 fluorine atoms with a halogen-free saturated non-polymerizable organic compound containing at least 2 carbon atoms having the general formula $RH_{b+1}$ wherein $b+1$ is a positive integer and represents the total number of hydrogen atoms attached directly to carbon atoms of the radical R. Said terminally substituted halocarbon compounds may be represented by the general formula $H(CZ_2CZ_2)_nRH_b$ as hereinbefore defined. However, it is also possible, by reacting the aforementioned tetrahaloethylene and halogen-free non-polymerizable organic compound, to obtain products in which all of the fluoroethylene units are not necessarily connected together and which may be represented by the general formula $H(CZ_2CZ_2)_{n-m}RH_{b-1}(CZ_2CZ_2)_mH$ wherein the Z substituents are halogen atoms of which at least 3 in each $CZ_2CZ_2$ unit are fluorine atoms, $n$ is a positive integer within the range of from 1 to 12, $m$ is a number selected from the group consisting of zero and positive integers not greater than $n$ (i. e., $m$ is a whole number within the range of from 0 to a number not greater than $n$), and $RH_{b-1}$ represents a halogen-free saturated divalent organic radical containing $b-1$ hydrogen atoms attached directly to carbon atoms and containing at least 2 carbon atoms. The sum total of the atoms other than the fluoroethylene units, $CZ_2CZ_2$, is equivalent to only one molecule of the original halogen-free saturated organic compound $RH_{b+1}$.

The reactions involved in the preparation of compounds having the hereinbefore defined general formula $H(CZ_2CZ_2)_{n-m}RH_{b-1}(CZ_2CZ_2)_mH$ are illustrated by the following equations. For convenience of illustration the equations are presented for the reaction between tetrafluoroethylene and n-butane.

$$(n-m)CF_2=CF_2+C_4H_{10}\rightarrow H(CF_2CF_2)_{n-m}C_4H_9$$

$$H(CF_2CF_2)_{n-m}C_4H_9+mCF_2=CF_2\rightarrow$$
$$H(CF_2CF_2)_{n-m}C_4H_8(CF_2CF_2)_mH$$

In the above equations $n$ is a positive integer within the range of from 1 to 12 and $m$ is a number selected from the group consisting of 0 and positive integers not greater than $n$.

While our invention has been described with particular reference to the halogenation of terminally substituted halocarbons having the aforementioned general formula $H(CZ_2CZ_2)_nRH_b$, it is to be understood that said invention also includes halogenating with a halogen having an atomic weight of less than 80, a compound having the hereinbefore defined general formula $H(CZ_2CZ_2)_{n-m}RH_{b-1}(CZ_2CZ_2)_mH$. The resultant products are terminally substituted halocarbons having the general formula $$X(CZ_2CZ_2)_{n-m}RH_{b-1-d}Y_d(CZ_2CZ_2)_mX$$

wherein the X substituents are atoms selected from the group consisting of hydrogen and halogen atoms of atomic weight less than 80, the Z substituents are halogen atoms of which at least 3 in each $CZ_2CZ_2$ unit are fluorine atoms, $n$ is a positive integer within the range of from 1 to 12, $m$ is a number selected from the group consisting of 0 and positive integers not greater than $n$, R is a halogen-free saturated polyvalent organic radical containing at least 2 carbon atoms and having a valence of $b+1$, $b-1$ is a positive integer and represents the total number of hydrogen and halogen atoms attached directly to carbon atoms of the radical R, $d$ is a number selected from the group consisting of 0 and positive integers not greater than $b-1$, Y is a halogen atom of atomic weight less than 80, and the group represented by $XRH_{b-1-d}Y_dX$ contains at least one halogen atom.

The products of this invention are useful for various commercial purposes. Since said products are extremely stable and nonflammable they are generally applicable for use as solvents, reaction media, fire extinguishers, hydraulic fluids, insulating oils, such as dielectric liquids for transformers, capacitors, switches, lubricants, plasticizers, and the like.

This invention is particularly advantageous in that it provides a safe, flexible, practicable and economical method of producing highly fluorinated products of the character herein described. Another advantage of this invention is that the process can be controlled easily and may be used to increase the boiling point and reduce flammability while lowering the freezing point of highly fluorinated compounds.

As many apparently widely different embodiments of this invention may be made without departing from the spirit and scope thereof, it is to be understood that we do not limit ourselves to the specific embodiments thereof except as defined in the appended claims.

Having described the present invention, the following is claimed as new and useful:

1. A method which comprises admixing chlorine in the presence of light with a carbon tetrachloride solution of a tetrafluoroethylene/n-butane reaction product boiling at 94–111° C./31 mm. consisting mainly of $H(C_2F_4)_4C_4H_9$, and continuing said treatment until from two to four chlorine atoms are introduced into said reaction product.

2. A mixture obtained by admixing chlorine in the presence of light with a carbon tetrachloride solution of a tetrafluoroethylene/n-butane reaction product boiling at 94–111° C./31 mm. consisting mainly of $H(C_2F_4)_4C_4H_9$, and continuing said treatment until from two to four chlorine atoms are introduced into said reaction product.

PAUL L. BARRICK.
ROBERT E. CHRIST.

REFERENCES CITED

The following references are of record in the file of this patent:

Locke et al., "Jour Am. Chem. Soc." vol. 56, pages 1726–8 (1934).

McBee et al., "Jour. Am. Chem. Soc." vol. 62, pages 3340–1 (1940).